(12) United States Patent
Song et al.

(10) Patent No.: US 11,673,613 B2
(45) Date of Patent: Jun. 13, 2023

(54) FRAME JOINT STRUCTURE AND METHOD

(71) Applicants: Hyundai Motor Company, Seoul (KR); Kia Corporation, Seoul (KR)

(72) Inventors: Won Ki Song, Seongnam-si (KR); Heedae Oh, Suwon-si (KR); Jung Jong Chun, Seoul (KR); Yeongjae Kim, Namyangju-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/466,692

(22) Filed: Sep. 3, 2021

(65) Prior Publication Data

US 2022/0185391 A1   Jun. 16, 2022

(30) Foreign Application Priority Data

Dec. 16, 2020   (KR) .......................... 10-2020-0176381

(51) Int. Cl.
| | |
|---|---|
| *B62D 27/02* | (2006.01) |
| *B62D 23/00* | (2006.01) |
| *B62D 21/02* | (2006.01) |
| *B62D 25/20* | (2006.01) |
| *B62D 25/06* | (2006.01) |
| *B62D 25/02* | (2006.01) |

(52) U.S. Cl.
CPC ........... *B62D 27/023* (2013.01); *B62D 21/02* (2013.01); *B62D 23/005* (2013.01); *B62D 25/02* (2013.01); *B62D 25/06* (2013.01); *B62D 25/2009* (2013.01)

(58) Field of Classification Search
CPC ............................ B62D 23/005; B62D 27/023
USPC .............................................. 296/205, 29, 30
See application file for complete search history.

(56) References Cited

U.S. PATENT DOCUMENTS

| | | | | |
|---|---|---|---|---|
| 4,355,844 A | * | 10/1982 | Fantini Muzzarelli | ...................... B62D 23/005 403/174 |
| 6,389,697 B1 | * | 5/2002 | Benoit | ................. B62D 27/023 219/617 |

FOREIGN PATENT DOCUMENTS

| | | | | |
|---|---|---|---|---|
| CH | 698916 B1 | * | 12/2009 | ............. B60R 19/34 |
| EP | 393303 A | * | 10/1990 | ............. F16L 37/113 |
| JP | 3183422 B2 | * | 4/2001 | ........... B62D 23/005 |

* cited by examiner

*Primary Examiner* — Dennis H Pedder
(74) *Attorney, Agent, or Firm* — Slater Matsil, LLP

(57) ABSTRACT

An embodiment frame joint structure includes a plurality of body members, each body member including a closed section portion having a closed section of a set shape and a flange portion integrally extending from the closed section portion, and a plurality of joints, each joint having a first end coupled to a connection point of a respective one of the body members and a second end coupled to an adjacent joint.

20 Claims, 9 Drawing Sheets

FRAME JOINT STRUCTURE AND METHOD

CROSS-REFERENCE TO RELATED APPLICATIONS

This application claims the benefit of Korean Patent Application No. 10-2020-0176381, filed in the Korean Intellectual Property Office on Dec. 16, 2020, which application is hereby incorporated herein by reference.

TECHNICAL FIELD

An exemplary embodiment of the present invention relates to a frame joint structure and method.

BACKGROUND

In general, a frame is a part that installs various devices or a body constituting a structure, and is a structure corresponding to a skeleton of a vehicle that supports a load transmitted from the vehicle body and a reaction force of the front and rear axles.

A space frame is a type of frame that constitutes a skeleton by connecting steel plates or pipes, and has the advantage of being light and having high rigidity.

In this space frame, the members are responsible for all the loads applied to the vehicle body, and for this reason, securing the connection of the members is more important than anything else.

Conventionally, the members of the space frame are connected by $CO_2$ welding or bolting, but these methods are somewhat disadvantageous in terms of productivity, cost and quality assurance.

The above information disclosed in this Background section is only for enhancement of understanding of the background of the invention, and therefore it may contain information that does not form the prior art that is already known to a person of ordinary skill in the art.

SUMMARY

An exemplary embodiment of the present invention relates to a frame joint structure and method. Particular embodiments relate to a frame joint structure of a vehicle and method.

Embodiments of the present invention provide a frame joint structure and method such that members having a closed cross section can be joined by spot welding.

A frame joint structure according to an exemplary embodiment of the present invention may include i) a body member including a closed section portion having a closed section of a set shape and a flange portion integrally extending from the closed section portion, and ii) a joint coupled to connection points adjacent to each other of the body members and joined to each other between the connection points.

Further, in the frame joint structure according to an exemplary embodiment of the present invention, the closed section portion may form a circular closed cross section.

Further, in the frame joint structure according to an exemplary embodiment of the present invention, the edge of the closed section and the flange portion may be connected through a welding line.

Further, in the frame joint structure according to an exemplary embodiment of the present invention, the joint may include a first portion welded to the connection point of the body member, and a second portion extending integrally with the first portion and protruding from a connection point of the adjacent body member.

Further, in the frame joint structure according to an exemplary embodiment of the present invention, a joint mounting groove corresponding to the thickness of the first portion may be formed at the connection point of the body member.

Further, in the frame joint structure according to an exemplary embodiment of the present invention, the second portion may have a thickness smaller than that of the first portion, and is connected to the first portion stepwise.

Further, in the frame joint structure according to an exemplary embodiment of the present invention, the second portions of the joint adjacent to each other may overlap each other and may be spot welded.

Further, in the frame joint structure according to an exemplary embodiment of the present invention, the body member may include any one frame selected from a roof side frame and a floor side frame.

Further, in the frame joint structure according to an exemplary embodiment of the present invention, any one panel component selected from a roof panel and a floor panel may be spot welded to the flange portion.

Further, in the frame joint structure according to an exemplary embodiment of the present invention, the panel component may be spot welded on a same plane of the flange portion and the joint.

Further, a frame joint method according to an exemplary embodiment of the present invention includes: (a) welding a blank patch to a main panel and providing a patched panel assembly; (b) forming a part of the patched panel assembly as a pipe, and forming a body member having a flange portion integrally extending in a closed section, and a joint coupled to a connection point of the body member; (c) welding an edge of the closed section that are butted to each other and the flange portion; and (d) spot welding the joints to each other between adjacent connection points of the body members.

Further, the frame joint method according to an exemplary embodiment of the present invention may further include (e) spot welding a panel component to the flange portion.

Further, in the frame joint method according to an exemplary embodiment of the present invention, in the step (a), the main panel and the blank patch may be overlapped and spot welded.

Further, in the frame joint method according to an exemplary embodiment of the present invention, in the step (c), the edge of the closed section and the flange may be welded to each other by laser welding.

Further, in the frame joint method according to an exemplary embodiment of the present invention, in the step (d), a portion protruding from the connection point of the body member may be overlapped and spot welded.

Further, in the frame joint method according to an exemplary embodiment of the present invention, in the step (e), the panel component may be spot welded on the same plane of the flange portion and the joint.

In exemplary embodiments of the present invention, as body members having a closed cross section are connected by spot welding through a joint integrally provided with the body member, it is advantageous in terms of assembly productivity, assembly cost, and assembly quality of the vehicle body.

Further, effects that can be obtained or expected from exemplary embodiments of the present invention are directly or suggestively described in the following detailed description. That is, various effects expected from exemplary embodiments of the present invention will be described in the following detailed description.

BRIEF DESCRIPTION OF THE DRAWINGS

In the following detailed description, only certain exemplary embodiments of the present invention have been shown and described, simply by way of illustration.

Figure 1:
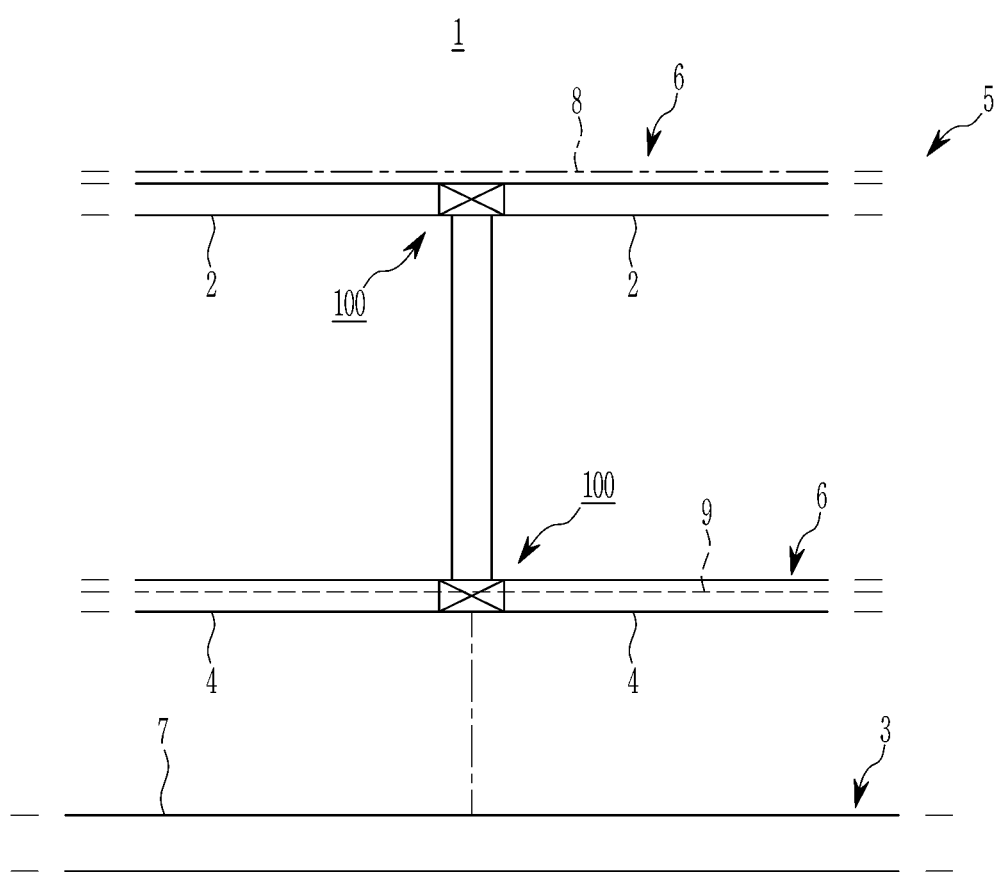
FIG. 1 is a diagram illustrating an example of a vehicle that can be applied to a frame joint structure according to an exemplary embodiment of the present invention.

The following elements may be used in connection with the drawings to describe embodiments of the present invention.

| |
|---|
| 1: PBV |
| 2: roof side frame |
| 3: under body |
| 4: floor side frame |
| 5: upper body |
| 6: panel component |
| 7: chassis frame |
| 8: roof panel |
| 9: floor panel |
| 10: body member |
| 11: joint point |
| 13: joint mount groove |
| 21: closed section |
| 23: closed cross-section |
| 31: flange portion |
| 33: welding line |
| 50: joint |
| 51: first portion |
| 52: second portion |
| 71: main panel |
| 73: blank patch |
| 75: patched panel assembly |
| 100: frame joint structure |

DETAILED DESCRIPTION OF ILLUSTRATIVE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Parts that are irrelevant to the description are omitted to clearly illustrate embodiments of the present invention, and like reference numbers designate like constituent elements through the specification.

Further, the size and thickness of each configuration shown in the drawings are optionally illustrated for better understanding and ease of description, the present invention is not limited to shown drawings, and the thickness is exaggerated for clarity of a plurality of parts and regions.

In the following detailed description, the terms "first" and "second" will be used to discriminate one component from the other component, but the components may not be limited to the above terms.

In addition, in the following specification, unless explicitly described to the contrary, the word "comprise" and variations such as "comprises" or "comprising" will be understood to imply the inclusion of stated elements but not the exclusion of any other elements.

In the following description, the suffixes "~part" and "~means" mean units of a general configuration that perform at least one function or operation.

FIG. 1 is a diagram illustrating an example of a vehicle that can be applied to a frame joint structure according to an exemplary embodiment of the present invention.

Referring to FIG. 1, a frame joint structure according to an exemplary embodiment of the present invention, for example, can be applied to a purpose built vehicle (PBV) 1 based on an electric vehicle.

Here, the PBV 1 is an eco-friendly mobile vehicle that provides customized services necessary for passengers during the time of moving from the ground to the destination. The PBV 1 is capable of setting an optimal route for each situation and driving in clusters, and further, may be a box-type design vehicle having a large indoor space.

Such a PBV 1 includes an under body 3 of a skateboard type and an upper body 5 as a monocoque type vehicle body mounted on the under body 3.

The under body 3 is also referred to as a rolling chassis in the art, and includes a chassis frame 7 on which a battery assembly (not shown in the drawings) can be mounted.

In addition, the upper body 5 is a body coupled to the under body 3 and may constitute a cabin. The upper body 5 may be, for example, a space frame in which a plurality of members such as steel plates or pipes are connected to form a skeleton.

In the industry, the vehicle width direction is referred to as the L direction, the length direction of the vehicle body (the front and rear direction) is the T direction, and the height direction of the vehicle body is called the H direction. However, in an embodiment of the present invention, instead of setting the LTH direction as the reference direction as described above, the components are described below by setting the vehicle width direction, the vehicle body front-rear direction, and the vertical direction.

Furthermore, the end (one/one end or the other/one end) in the following may be defined as either end. It may be defined as a certain part (one/one end or the other/one end) including the end.

Meanwhile, the frame joint structure 100 according to an exemplary embodiment of the present invention is a member connection structure of the upper body 5 as described above, and may include a structure in which linear or curved members are connected in a front-rear direction, a vehicle width direction, and an up-down direction.

However, in the exemplary embodiment of the present invention, in the members of the upper body 5, a structure in which the roof side frames 2 on the front and rear sides and the floor side frames 4 on the front and rear sides are connected to each other along the transverse direction will be described as an example.

In addition, in the exemplary embodiment of the present invention, as the panel component 6, a structure in which the roof panel 8 and the follower panel 9 are joined to the roof side frames 2 and the floor side frames 4, respectively, is further included.

The frame joint structure 100 according to the embodiment of the present invention provides a structure in which members having closed cross sections are joined by spot welding and the panel components 6 are joined to the members.

Figure 2:
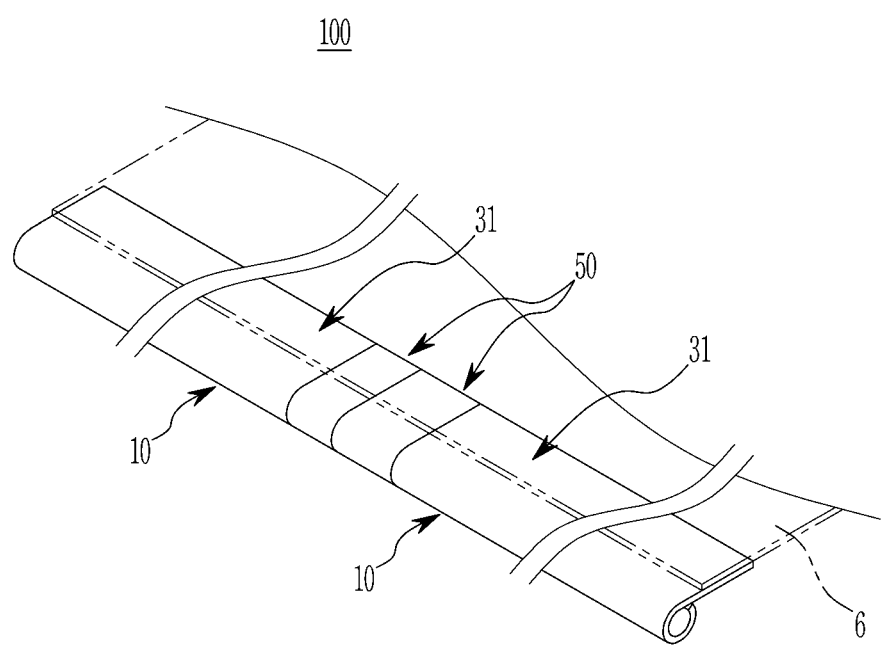
FIG. 2 is a combined perspective view showing a frame joint structure according to an exemplary embodiment of the present invention.
Figure 3:
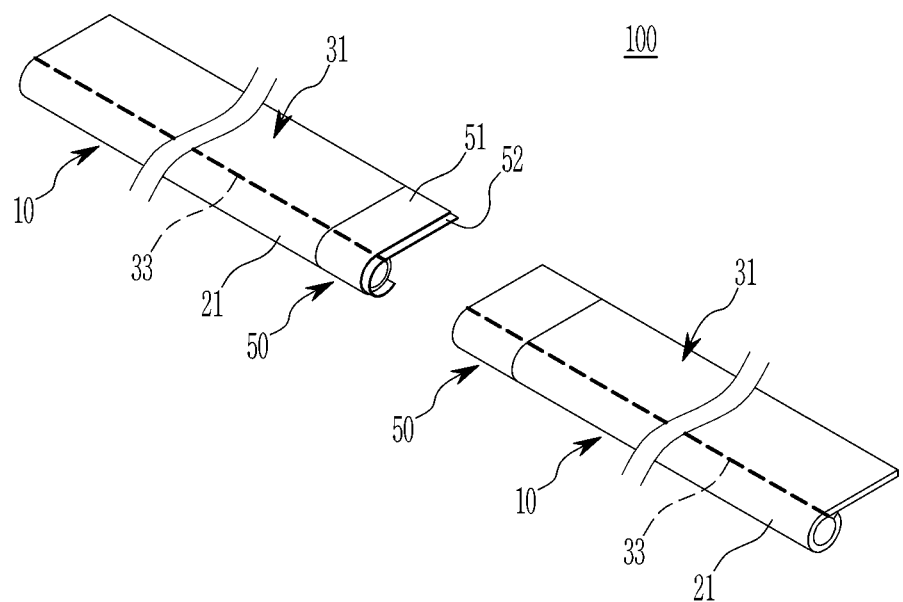
FIG. 3 is an exploded perspective view showing a frame joint structure according to an exemplary embodiment of the present invention.
Figure 4:
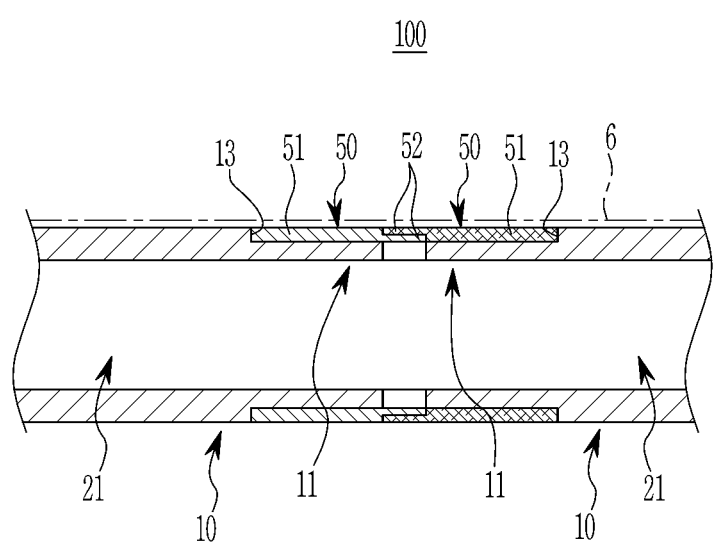
FIG. 4 is a cross-sectional view illustrating a frame joint structure according to an exemplary embodiment of the present invention.

FIG. 2 is a combined perspective view showing a frame joint structure according to an exemplary embodiment of the present invention, FIG. 3 is an exploded perspective view showing a frame joint structure according to an exemplary embodiment of the present invention, and FIG. 4 is a cross-sectional view illustrating a frame joint structure according to an exemplary embodiment of the present invention.

Referring to FIG. 2 to FIG. 4, the frame joint structure 100 according to an exemplary embodiment of the present invention includes body members 10 and a joint 50.

In an exemplary embodiment of the present invention, the body members 10 include transverse frames such as roof side frames 2 and floor side frames 4 in the upper body 5 as shown in FIG. 1.

Figure 5:
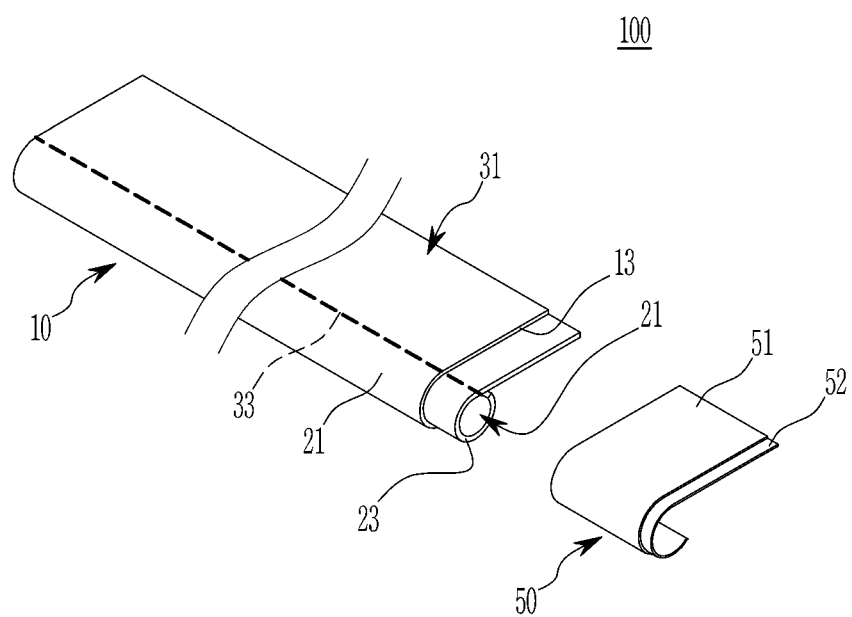
FIG. 5 is an exploded perspective view of a body member and a joint applied to a frame joint structure according to an exemplary embodiment of the present invention.

This body member 10 is a part of the panel cut to a set size and is tube-molded, and includes a closed section portion 21 and a flange portion 31 connected integrally, as shown in FIG. 5.

The closed section portion 21 is a tube forming part of the panel, and forms a circular closed section 23 along the transverse direction.

The flange portion 31 is the rest of the panel and integrally extends from the end face of the circular closed section 23 of the closed section 21 and is disposed along the longitudinal direction of the closed section 21. Here, the edge of the circular closed section 23 and the flange portion 31 are connected through a welding line 33.

In an embodiment of the present invention, the joint 50 is for connecting the body members 10 along the transverse direction, and is integrally coupled to the adjacent connection points 11 of the body members 10 to be connected to each other. Furthermore, the joints 50 may be bonded to each other between the connection points 11 adjacent to each other of the body members 10.

The joint 50 includes a first portion 51 and a second portion 52 connected integrally. The first portion 51 is bonded to the connection point 11 of the body member 10 by spot welding.

In this way, in order to couple the first portion 51 to the connection point 11 of the body member 10, the connection point 11 has a joint mounting groove 13 corresponding to the thickness of the first portion 51. That is, the first portion 51 is coupled to the joint mounting groove 13 at the connection point 11 of the body member 10.

The second portion 52 is integrally connected (extended) to the first portion 51 and protrudes to the connection point 11 of the adjacent body member 10. Here, the second portion 52 has a thickness smaller than that of the first portion 51 and is connected to the first portion 51 stepwise.

The second portion 52 as described above overlaps in the vertical direction between the connection points 11 adjacent to each other of the body members 10 and is joined by spot welding.

On the other hand, in the exemplary embodiment of the present invention, a panel component 6 is bonded to the flange portion 31 of the body members 10, and the panel component 6 is bonded on the same plane of the flange portion 31 and the joint 50 by spot welding.

Hereinafter, a frame joint method (assembly method) of the frame joint structure 100 according to an exemplary embodiment of the present invention configured as described above will be described in detail with reference to the previously disclosed drawings and the accompanying drawings.

FIG. 6 to FIG. 9 are views for explaining a frame joint method according to an exemplary embodiment of the present invention.

Figure 6:
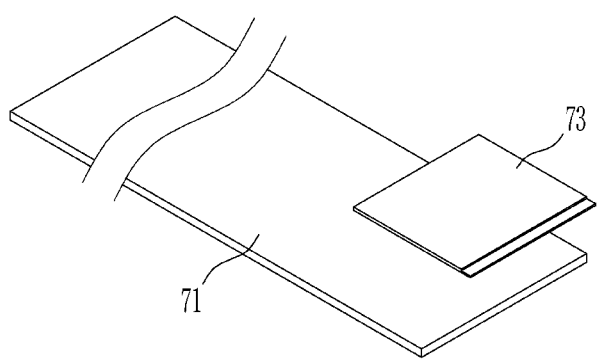
FIG. 6 to FIG. 9 are views for explaining a frame joint method according to an exemplary embodiment of the present invention.

Referring to FIG. 6, first, in the exemplary embodiment of the present invention, a main panel 71 cut to a set size is provided, and a blank patch 73 cut to a size smaller than the main panel 71 is provided.

Figure 7:
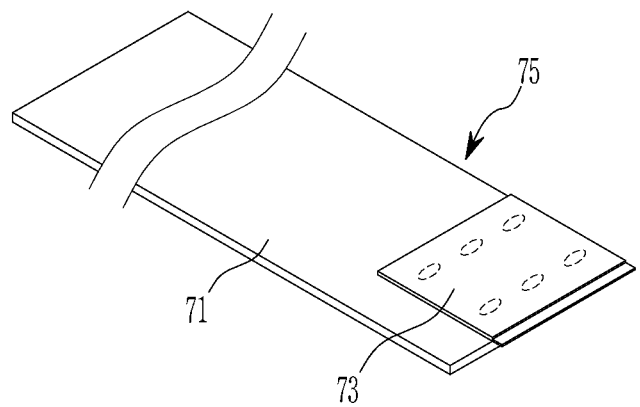

Next, in the exemplary embodiment of the present invention, as shown in FIG. 7, the blank patch 73 is overlaid on one end of the main panel 71. The blank patch 73 is placed on the main panel 71 as a spot joined by welding. Accordingly, an exemplary embodiment of the present invention provides a patched panel assembly 75 in which the main panel 71 and the blank patch 73 are bonded to each other.

Figure 8:
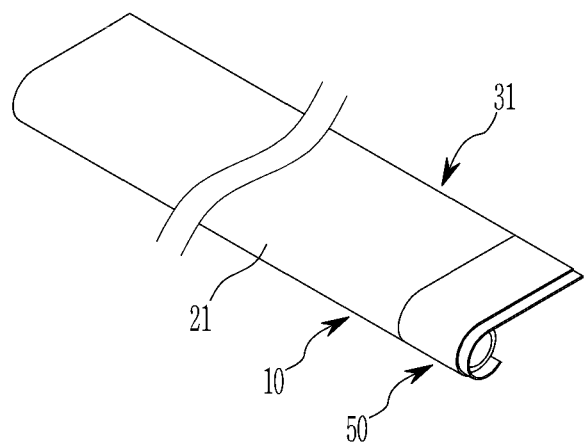

Then, in the exemplary embodiment of the present invention, a part of the patched panel assembly 75 is formed into a tube as shown in FIG. 8. In this process, a part of the patched panel assembly 75 may be pipe-formed by a U-O forming method, a multi-stage roll forming method, and a roll bending method of techniques known in the art.

Accordingly, in the exemplary embodiment of the present invention, a body member 10 having a closed section 21 having a circular closed section 23 (refer to FIG. 5), a flange portion 31 integrally extended to the closed section 21, and a joint 50 integrally coupled to the connection point 11 (refer to FIG. 4) of the body member 10 are formed.

Figure 9:
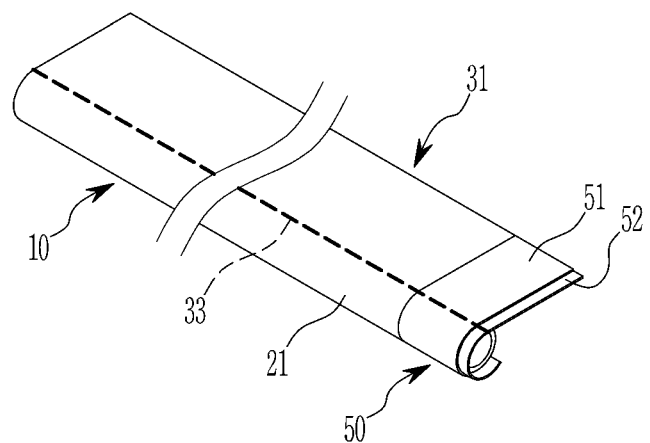

Then, in the embodiment of the present invention, as shown in FIG. 9, the edge and the flange portion 31 of the closed section 21 butted to each other by the above-described pipe forming are joined by laser welding, and a welding line 33 is formed.

Here, the first portion 51 of the joint 50 is coupled to the connection point 11 of the body member 10, and the second portion 52 extends integrally from the first portion 51 and protrudes from the connection point 11 to a set width. Furthermore, the flange portion 31 and the joint 50 are in a state of being connected in a plane of the same height.

Next, in the exemplary embodiment of the present invention, the two body members 10 that integrate the joint 50 as described above are arranged along the transverse direction, and the adjacent joints 50 are joined by spot welding (refer to FIG. 4).

In this process, in a state in which the second portions 52 of the joints 50 are overlapped in the vertical direction between the connection points 11 adjacent to each other of the body members 10, these second portions 52 are joined by spot welding, and the joints 50 are interconnected.

Next, in the exemplary embodiment of the present invention, the panel components 6 such as the roof panel 8 and the follower panel 9 are spot-welded to the flange portions 31 of the body members 10. In the above process, the panel component 6 is spot-welded on the same plane of the flange portion 31 and the joint 50 (refer to FIG. 4).

According to the frame joint structure 100 and method according to the embodiments of the present invention as described so far, the body members 10 having a closed cross-section are connected to the body member 10 through the joint 50 integrally provided. It can be connected by spot welding.

Therefore, in the exemplary embodiments of the present invention, unlike the prior art in which the members of the frame are connected by $CO_2$ welding or bolting, etc., advantageous effects are exhibited in terms of securing the assembly productivity, assembly cost, and assembly quality of the vehicle body.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A frame joint structure comprising:
   a plurality of body members, each body member including a closed section portion having a closed section of a set shape and a flange portion integrally extending from the closed section portion; and
   a plurality of joints, each joint having a first end coupled to a connection point of a respective one of the body members and a second end coupled to an adjacent joint, wherein a roof panel or a floor panel is spot welded to the flange portion on a same plane of the flange portion and the joints.

2. The frame joint structure of claim 1, wherein:
   the closed section portion forms a circular closed cross section; and
   an edge of the closed section and the flange portion are connected through a welding line.

3. The frame joint structure of claim 1, wherein each of the joints comprises:
   a first portion welded to the connection point of the respective body member; and
   a second portion extending integrally with the first portion and protruding toward the second end of the adjacent joint.

4. The frame joint structure of claim 3, wherein each body member includes a joint mounting groove corresponding to a thickness of the first portion formed at the connection point.

5. The frame joint structure of claim 4, wherein the second portion has a thickness smaller than that of the first portion and is connected to the first portion stepwise.

6. The frame joint structure of claim 3, wherein the second portions of the joints adjacent to each other overlap each other and are spot welded.

7. The frame joint structure of claim 1, wherein the body members each include a roof side frame or a floor side frame.

8. A vehicle comprising:
   an under body including a chassis frame; and
   an upper body mounted on the under body, the upper body comprising a frame joint structure comprising:
      a first body member comprising a first closed section portion having a first closed section of a set shape and a first flange portion integrally extending from the first closed section portion;
      a first joint coupled to a first connection point of the first body member;
      a second body member adjacent to the first body member and comprising a second closed section portion having a second closed section of a set shape and a second flange portion integrally extending from the second closed section portion; and
      a second joint coupled to a second connection point of the second body member, wherein the first joint and the second joint are joined to each other between the first and the second connection points; and
      a roof panel or a floor panel spot welded to the first flange portion.

9. The vehicle of claim 8, wherein:
   the first closed section portion forms a circular closed cross section; and
   an edge of the first closed section and the first flange portion are connected through a welding line.

10. The vehicle of claim 8, wherein the first and the second body members comprise a roof side frame or a floor side frame.

11. The vehicle of claim 8, wherein the roof panel or the floor panel is spot welded on the same plane of the first flange portion and the first and the second joints.

12. A frame joint structure comprising:
   a plurality of body members, each body member including a closed section portion having a closed section of a set shape and a flange portion integrally extending from the closed section portion; and
   a plurality of joints, each joint having a first end coupled to a connection point of a respective one of the body members and a second end coupled to an adjacent joint;
   wherein each of the joints comprises a first portion welded to the connection point of the respective body member and a second portion extending integrally with the first portion and protruding toward the second end of the adjacent join; and
   wherein each body member includes a joint mounting groove corresponding to a thickness of the first portion formed at the connection point.

13. The frame joint structure of claim 12, wherein:
   the closed section portion forms a circular closed cross section; and
   an edge of the closed section and the flange portion are connected through a welding line.

14. The frame joint structure of claim 12, wherein the second portion has a thickness smaller than that of the first portion and is connected to the first portion stepwise.

15. The frame joint structure of claim 12, wherein the second portions of the joints adjacent to each other overlap each other and are spot welded.

16. The frame joint structure of claim 12, wherein the body members each include a roof side frame or a floor side frame.

17. The frame joint structure of claim 1, wherein a roof panel is spot welded to the flange portion on the same plane of the flange portion and the joints.

18. The frame joint structure of claim 1, wherein a floor panel is spot welded to the flange portion on the same plane of the flange portion and the joints.

19. The vehicle of claim 8, wherein the roof panel or the floor panel comprises a roof panel spot welded to the first flange portion.

20. The vehicle of claim 8, wherein the roof panel or the floor panel comprises a floor panel spot welded to the first flange portion.

* * * * *